United States Patent [19]

Goodloe

[11] Patent Number: 4,639,905
[45] Date of Patent: Jan. 27, 1987

[54] DUAL-MODE VIBRATOR

[75] Inventor: Kent J. Goodloe, Sugarland, Tex.

[73] Assignee: Western Geophysical Co. of America, Houston, Tex.

[21] Appl. No.: 677,292

[22] Filed: Dec. 3, 1984

[51] Int. Cl.⁴ .................... H04R 11/00; G01V 1/00; G01V 1/04
[52] U.S. Cl. ..................... 367/189; 367/75; 181/119; 181/121; 181/401
[58] Field of Search ............... 367/143, 189, 190, 75; 181/113, 114, 119, 121, 400, 401

[56] References Cited

U.S. PATENT DOCUMENTS

| | | | |
|---|---|---|---|
| 3,306,391 | 2/1967 | Bays | 181/5 |
| 4,056,164 | 11/1977 | Johnston | 181/119 |
| 4,135,598 | 1/1979 | Stafford | 181/114 |
| 4,135,599 | 1/1979 | Fair | 181/121 |
| 4,143,736 | 3/1979 | Fair | 181/119 |
| 4,244,437 | 1/1981 | Fulkerson | 181/114 |
| 4,291,780 | 9/1981 | Fulkerson | 181/114 X |
| 4,321,981 | 4/1982 | Waters | 181/119 |
| 4,390,077 | 6/1983 | Fulkerson | 181/114 X |
| 4,410,062 | 10/1983 | Mifsud | 181/121 |

FOREIGN PATENT DOCUMENTS 714324 8/1980 U.S.S.R. .

Primary Examiner—Charles T. Jordan
Assistant Examiner—Brian S. Steinberger
Attorney, Agent, or Firm—Barry C. Kane; William A. Knox

[57] ABSTRACT

A dual mode vibrator assembly for selectively generating either pressure wave or shear wave signals in the earth has a single inertia mass with a plurality of vertically parallel offset cylinder bores and at least one horizontal cylinder bore extending therethrough. Each cylinder bore reciprocably retains a piston member and is in fluid communication with a fluid source. The lower ends of the vertical piston members are connected to a base plate to generate pressure waves. A foot member is connected to each end of the horizontal piston member and interconnected by anti-roll rails in sliding relationship with the inertia mass. Cleats are connected to the bottom of each foot member to engage the earth for generating shear waves. A manifold directs fluid from a servo-valve either to passages leading to the vertical cylinder bores for pressure wave operation or to the horizontal cylinder bore for shear wave operation.

1 Claim, 5 Drawing Figures

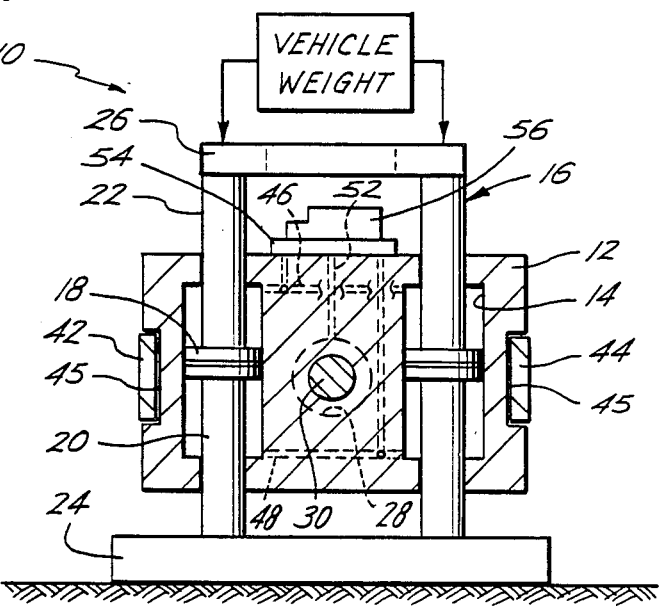
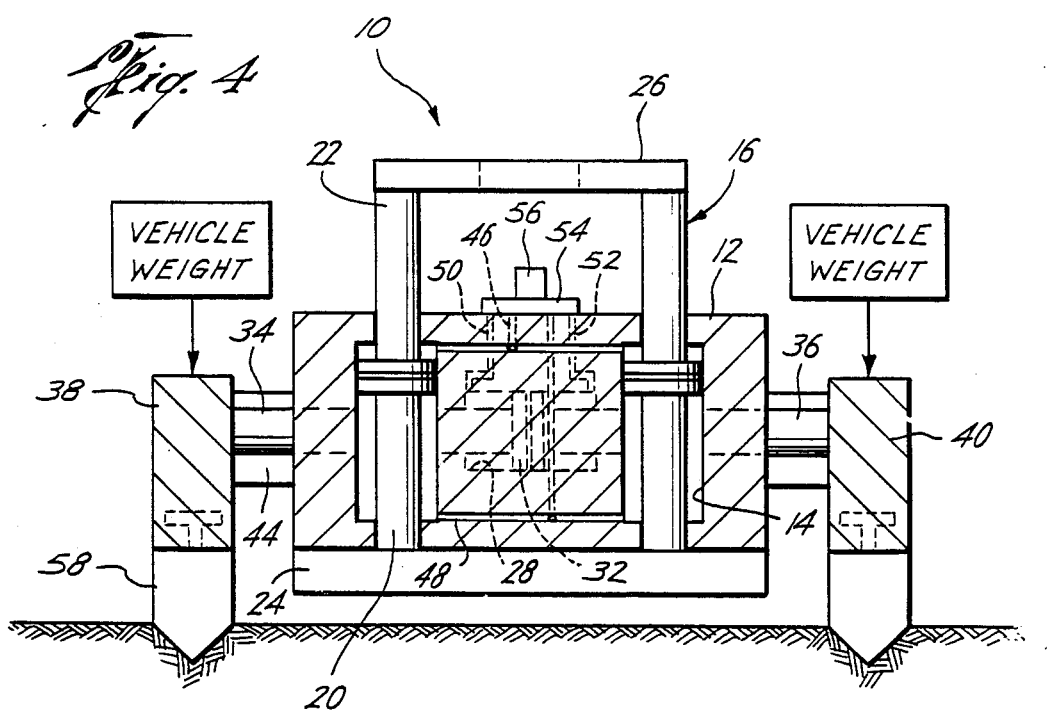

DUAL-MODE VIBRATOR

BACKGROUND OF THE INVENTION

1. Field of the Invention

This invention relates to a dual-mode vibrator assembly capable of generating either compressional waves or shear waves for use in seismic exploration.

2. Description of the Related Art

In vibrational seismic surveys, vibrators mounted on heavy-duty vehicles generate and inject a swept-frequency wave train into the earth. The generated wave train propagates downwardly and is reflected upwards from subterranean lithologic boundaries and is received and recorded as a composite signal having a plurality of the reflected swept-frequency signals distributed at various time-phase positions on the record. The composite record is then correlated with a replica of the original transmitted signal to produce useful seismic data.

In general, seismic signals from a physical disturbance propagate through the earth in two modes. One mode is represented by a compressional or pressure (P) wave, wherein particle motion is parallel to the wave propagation direction. The second mode is a shear (S) wave, wherein the particle motion is perpendicular to the wave propagation direction. Shear waves generated at the earth's surface may represent motion either parallel to the earth's surface or at any angle thereto. In geophysical exploration however, only the shear waves generated wherein the particle motion is parallel to the earth's surface, i.e. horizontal, are of interest. Further references to shear waves will be restricted to horizontal shear waves ($S_H$).

Both P- and S-waves are used is seismic exploration and are injected into the earth by vibrators. In general a vibrator assembly consists of an inertia mass of several hundred to several thousand pounds. The mass includes an internal cylinder within which is mounted a reciprocable piston. At least one piston rod interconnects the piston with a baseplate in contact with the ground. An electro-hydraulic servo-valve introduces fluid under pressure alternately to opposite sides of the piston within the inertia-mass cylinder. Reciprocation of the piston and piston rod relative to the inertia mass causes the baseplate to shake the ground.

It should be understood that the axis of motion of the vibrator assembly is mounted vertically for P-wave generation. Conversely, the axis of motion of the vibrator assembly for S-wave generation is horizontal, hence the reciprocating motion is also horizontal.

Heretofore it was necessary to provide separate vibrator assemblies, one for P-wave and one for S-wave generation, as illustrated in FIGS. 1 and 2 of U.S. Pat. No. 4,410,062 issued to Fair. Because the vibrator assemblies are very heavy, separate vehicles are usually required to handle them. Separate P- and S-wave vibrator assemblies have been mounted on a single vehicle, such as the Mertz VSP Universal Vibrator. The large size of the Mertz vehicle precludes off-road use in most cases.

A dual-mode, single-actuator vibrator assembly is disclosed in U.S. patent application Ser. No. 602,559, assigned to a company related to the assignee of this invention. The dual-mode vibrator consists of a single actuator that injects P-waves or S-waves into the earth by altering the linkage configuration connecting the vibrator assembly to the base plate.

The vibrator assembly disclosed in the aforementioned U.S. Pat. No. 4,143,736 issued to Fair consists of a single actuator mass having a plurality of parallel offset cylinder bores reciprocally retaining a like number of pistons therein. As cited in the first example, two vibrator assemblies are required to inject each wave type. For a single truck to generate both P-waves and S-waves, the P-wave vibrator assembly must be exchanged for an S-wave vibrator assembly and vice versa.

BRIEF SUMMARY OF THE INVENTION

The present invention relates to a seismic vibrator assembly for generating P-waves and S-waves in the earth. The vibrator assembly has an inertia mass having a plurality of cylinder bores extending therethrough in a first vertical direction and at least one cylinder bore therein transverse to the first bores, in a second direction. Each cylinder bore retains a piston member having a dual-ended piston rod and a centrally disposed piston; each piston-rod end extends from the inertia mass. Coupled to one end of the vertical piston members is a base plate. Coupled to each end of the transverse piston member is a ground-engaging foot member interconnected by a frame.

Within the inertia mass are passages through which fluid under pressure is introduced to the cylinders in such a fashion as to reciprocate the inertia mass relative to the vertical piston members or relative to the transverse piston member.

It is an object of this invention to provide a single vibrator assembly capable of injecting pressure waves and shear waves with minimum changeover effort by the operator.

Another object of this invention is to better distribute the reciprocating force of the mass upon the base plate.

BRIEF DESCRIPTION OF THE DRAWINGS

A better understanding of the benefits and advantages of my invention may be obtained from the appended detailed description and the drawings, wherein:

FIG. 3 is a side elevational view of the vibrator assembly as shown in partial cross-section.

FIG. 4 is a frontal elevational view of the dual-mode vibrator assembly in the shear-wave mode.

DETAILED DESCRIPTION OF THE PREFERRED EMBODIMENT

As used in seismic surveying, a vibrator generally consists of an inertia mass and piston members, a base plate and supports. The vibrator is normally mounted to the chassis of a heavy-duty vehicle. A portion of the weight of the vehicle is used to apply a bias force to the vibrator base plate to prevent decoupling from the ground during operation. Usually the vibrator is mounted on the vehicle by hydraulic jacks so the base plate may be lowered to the ground, or raised clear of the ground for transport. Compliant isolator members such as airbags couple the base plate to the hydraulic jacks. The compliant means isolate the vehicle from vibrations caused by the reciprocating base plate, yet allows the bias force of the vehicle to be applied to the base plate. Therefore, the term vibrator as used herein generally includes an inertia mass and piston members, a base plate with associated supports, a lifting mechanism, and isolation means. Mounting of a vibrator assembly to a vehicle chassis is well known in the art and is disclosed in U.S. Pat. No. 3,306,391 issued to Bays, and in U.S. patent application Ser. No. 602,559 assigned to a company related to the assignee of this invention. With this brief introduction, the dual-mode vibrator of this invention may now be studied in detail in FIGS. 1 through 5.

In the figures, similar components are indicated by similar numerals.

Figure 1:
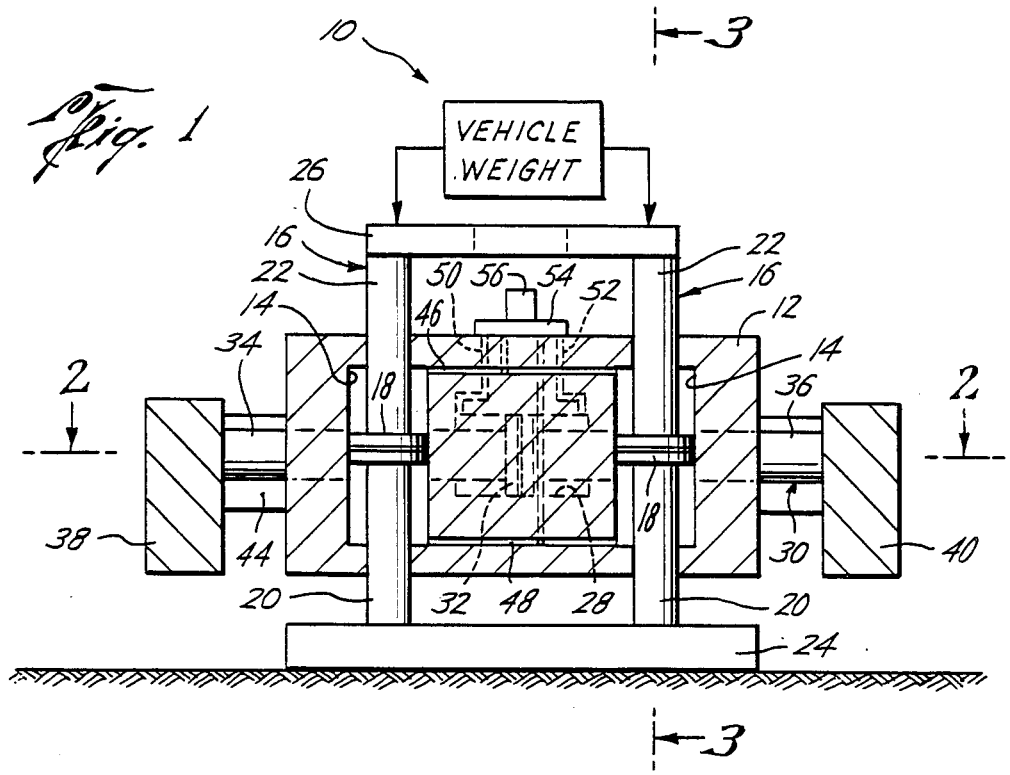
FIG. 1 is a frontal elevational view of a dual-mode vibrator assembly in the pressure-wave mode as shown in partial cross-section.
Figure 2:
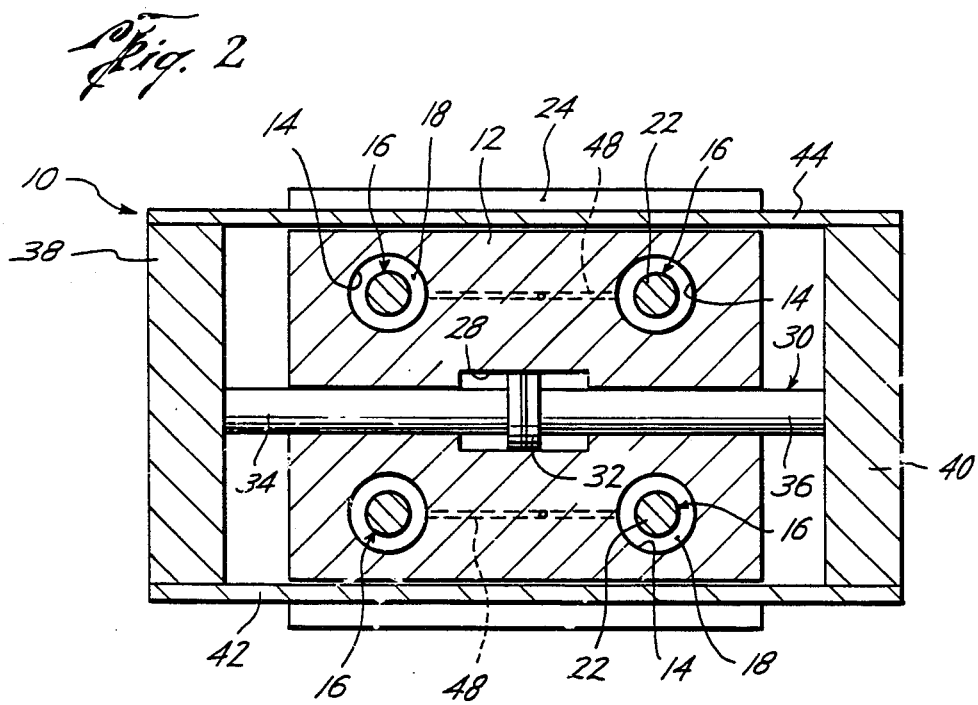
FIG. 2 is a top view of the actuator mass and the vertical piston members in partial cross-section.

As shown in FIGS. 1 through 3, a dual-mode vibrator 10 shown in partial cross-section, has an inertia mass 12 having a plurality of offset, vertically-parallel cylinder bores 14 extending therethrough. Reciprocably disposed within each such cylinder bore 14 is a piston member 16 having a central piston 18 and opposite extending piston rods 20 and 22. The free ends of lower piston rods 20 are rigidly coupled to a ground-engaging base plate 24 well known in the art. The free ends of upper piston rods 22 are rigidly coupled to a support 26.

As shown in FIGS. 2 and 3 at least one cylinder bore 28 is oriented horizontally, transverse to vertical cylinder bores 14. A piston member 30, consisting of a central piston 32 and opposing piston rods 34 and 36, is reciprocably disposed in the cylinder bore 28. The free ends of transverse piston rods 34 and 36 are each coupled to a foot member, 38 and 40 respectively. The foot members 38 and 40 are rigidly interconnected by rails 42 and 44.

Rails 42 and 44 are in sliding relationship along the sides of mass 12 within channels generally indicated as 45. A low friction material such as brass or polycarbonate plastic may line channels 45 to provide a substantially close fit yet allow smooth sliding of the mass 12 relative to rails 42 and 44. The rails 42 and 44 act as an anti-rotation device preventing rotation of the inertia mass 12 relative to the foot members 38 and 40.

Piston members 16 and 30 are reciprocated with respect to the actuator mass 12 by introducing fluid under pressure to cylinder bores 14 or 28. Passages 46, 48, 50, and 52 place cylinder bores 14 and 28 in fluid communication through a valve (not shown) in manifold 54 with a servo-valve 56. Manifold 54 may be operated to allow fluid to pass from a source through servo-valve 56 into either passages 46 and 48 or 50 and 52, but not all passages simultaneously. Passages 46 and 48 are in fluid communication with the cylinder bores 14. Passage 46 is in fluid communication with the upper portion of the cylinders and passage 48 is in fluid communication with the lower portion of the cylinders. Servo-valve 56 supplies fluid under pressure alternately to passages 46 and 48. Passages 46 and 48 direct the fluid to opposite sides of the pistons 18 at alternate intervals thereby reciprocating piston members 16 in concert along a first vertical axis. The valve in manifold 54, when repositioned, allows servo-valve 56 to alternately direct fluid to passages 50 and 52 which supply fluid to cylinder bore 28 on opposite sides of piston 32 for reciprocation of piston member 30 along a second horizontal axis.

Returning to FIG. 1, the dual-mode vibrator assembly 10 is shown in the P-wave configuration. The pistons 18 are centrally disposed within each such cylinder bore 14, forcing base plate 24 away from the mass 12. Base plate 24 is in contact with the earth. The partial weight of a vehicle carrying the vibrator assembly 10 is applied to support 26 to hold base plate 24 in contact with the ground during P-wave operation. The weight of the vehicle is applied by well-known hydraulic jacks and compliant members coupled to the support 26.

While in the P-wave mode, undesired horizontal movement of piston-member 30 is prohibited by locking the piston member 30 in place relative to the mass 12. The locking of the piston member 30 may be accomplished by wedging blocks between the inertia mass 12 and the foot members 38 and 40, inserting pins through holes in the piston rods adjacent to the inertia mass 12, or by supplying fluid under pressure equally to each side of piston 32. Thus the piston member 30, feet 38 and 40, and rails 42 and 44 provide additional weight to the inertia mass 12.

In FIG. 4 the dual-mode vibrator 10 is shown in the S-wave mode. The pistons 18 have been moved to the upper portions of cylinders 14, moving base plate 24 upwards relative to inertia mass 12. Shear-wave cleats, generally indicated as 58, are detachably coupled to the bottom of each foot member 38 and 40. The shear-wave cleats 58 engage the earth with the base plate 24 in the retracted position shown. The hold-down weight of the vehicle is redistributed to the top of each foot member 38 and 40 shown by the arrows, forcing the shear-wave cleats 58 in contact with the ground. For example, but not by way of limitation, the hold-down weight of the vehicle may be redistributed through a second set of hydraulic jacks connected to the vehicle. The hydraulic jacks may be detachably coupled through compliant isolator means such as airbags to the top of each foot member 38 and 40. The hydraulic jacks coupled to the top of support 26 may be uncoupled and retracted with respect to vibrator assembly 10.

In changing from the P-wave to S-wave mode, the additional weight of the piston member 30, together with feet 38 and 40, and rails 42 and 44 to the inertia mass 12 is removed and replaced by the weight of the piston members 16, base plate 24 and support 26.

In operation, P-waves are generated by applying the weight of the vehicle to base plate 24 through piston members 16 and support 26. A valve within manifold 54 is positioned to supply fluid to passages 46 and 48. Under system pressure the fluid centrally positions the pistons 16 within each cylinder bore 14, moving the base plate 24 away from the inertia mass 12 to contact the ground as shown in FIG. 1. P-waves are generated when servo-valve 56 alternately supplies high pressure fluid to passages 46 and 48, thereby reciprocating inertia mass 12, relative to piston members 16. Piston member 30 and foot members 38 and 40 are locked in position and form part of the actuator mass 12 in this mode of operation.

From the P-wave configuration, the vibrator assembly may be readily altered to generate S-waves. A preferred method is to raise the vibrator assembly 10 from the ground by hydraulic jacks (not shown) coupled to the vehicle. Shear-wave cleats 58 are detachably coupled to the bottom of each foot member 38 and 40. The vibrator assembly is relowered to the ground and the vehicle weight is redistributed to the top of each foot member 38 and 40 as previously mentioned. Base plate 24 is raised clear of the surface by supplying fluid under pressure to the lower side of each piston 18, thus forcing pistons 18 to the top of each cylinder 14 and if desired locked in place with any conventional means. Base plate 24 is retained in position against the mass 12. The piston member 30 is unlocked with respect to the inertia mass prior to S-wave generation.

S-waves are generated when hydraulic fluid from the servo-valve 56 is directed to alternate ends of cylinder bore 28 by a valve within manifold 54 to reciprocate the inertia mass 12 relative to the piston member 30. Horizontal reciprocal motion of the actuator mass 12 forces horizontal reciprocation of the cleats 58 engaging the ground to generate S-waves.

Figure 5:
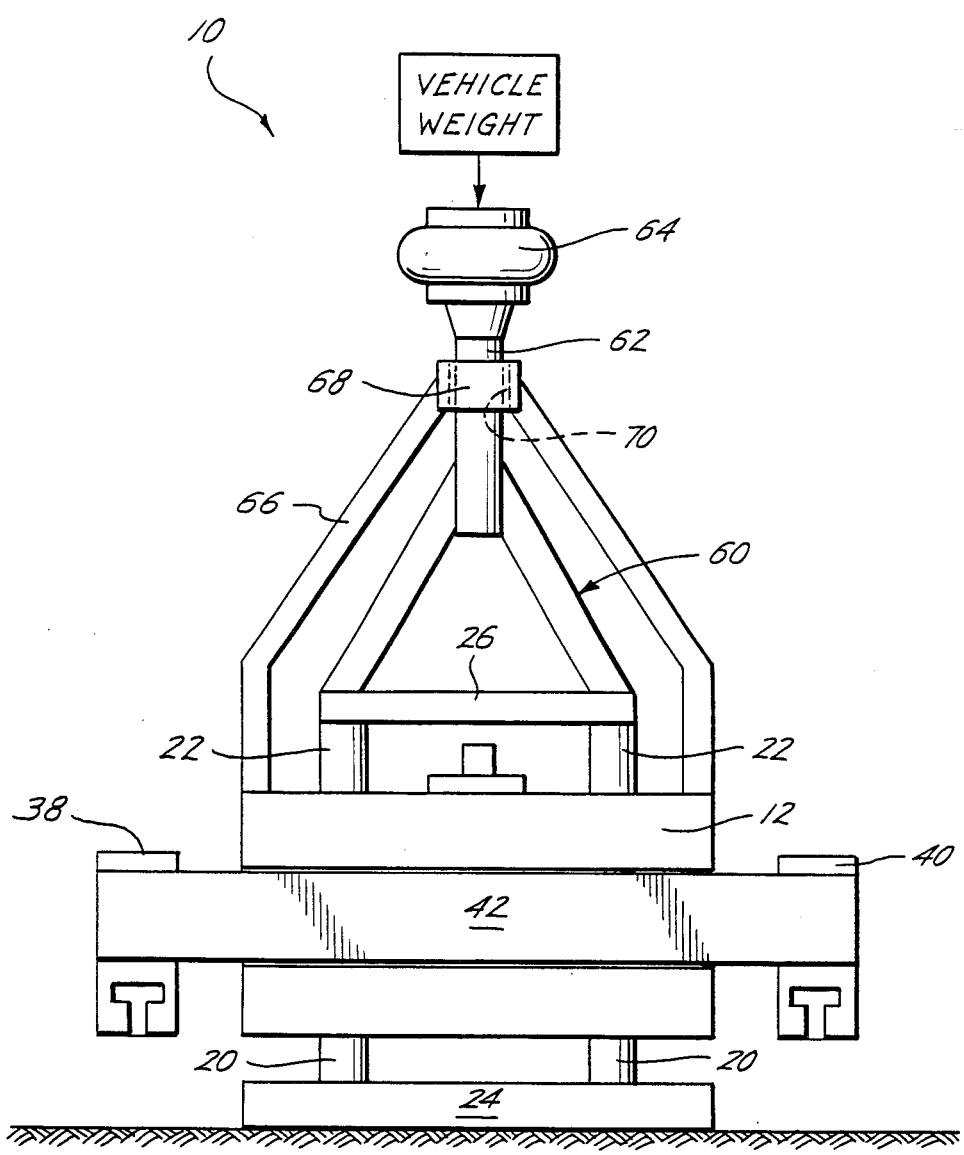
FIG. 5 is another embodiment of the vibrator hold-down configuration including a mass stabilizer.

FIG. 5 illustrates another embodiment of this invention. As shown in the Figure, a hold down structure 60 is connected to the top of the support 26. The upper portion of the structure constricts to a post 62 which is coupled to a compliant member such as an airbag 64. In a well-known manner, air bag 64 is coupled to a jacking member (not shown) which in turn is connected to the vehicle. A mass stabilizer 66 has its lower ends coupled to the outer extremities of the inertia mass 12. The upper portion of the mass stabilizer 66 is coupled to a collar 68 having a bushing 70 which is in sliding relationship with the post 62 of the hold down structure 60. The mass stabilizer 66 prevents binding of the actuator mass 12 with piston members 16 as shown in the other Figures while reciprocating with respect to piston members 16. It is to be understood that the operation and internal structure of the vibrator of this embodiment are substantially the same as those hereinabove described.

The hold down structure 60 is compliantly coupled to the vehicle for the reasons previously described.

For illustrative purposes, my invention has been described with a certain degree of specificity. Variations will occur to those skilled in the art but which may be included within the scope and spirit of this invention which is limited only by the appended claims.

I claim as my invention:

1. A dual-mode vibrator assembly for selectively injecting P-waves and S-waves into the earth, comprising:
   (a) an inertia mass having a plurality of cylinder bores therein parallel to a first direction and at least one cylinder bore therein essentially transverse to said first direction;
   (b) a plurality of first piston members reciprocally disposed within each of said parallel cylinder bores;
   (c) first means connected to said first piston members for contacting the earth;
   (d) a second piston member reciprocally disposed within said at least one cylinder bore;
   (e) second means connected to said second piston member for contacting the earth;
   (f) means for selectively placing said first earth-contacting means or said second earth-contacting means in contact with the earth;
   (g) means for directing said inertia mass to reciprocate parallel to said first direction when said first means is in contact with the earth, said means for directing said inertia mass to reciprocate parallel to said first direction having means for simultaneously supplying a fluid under pressure to said plurality of first piston members within each of said parallel cylinder bores when said first means is in contact with the earth;
   (h) means for directing said inertia mass to reciprocate parallel to said second direction when said second means is in contact with the earth, said means for directing said inertia mass to reciprocate parallel to said second direction having means for supplying said fluid under pressure to said second piston member within said at least one cylinder bore when said second means is in contact with the earth; and
   (i) means interconnecting said means for contacting the earth, and in sliding relationship with said inertia mass for preventing said inertia mass from rotating about said second piston member.

* * * * *